United States Patent [19]

Kim et al.

[11] Patent Number: 5,894,470
[45] Date of Patent: Apr. 13, 1999

[54] FLOATING CELL REMOVING DEVICE USING GENERIC FLOW CONTROL AND A METHOD THEREOF

[75] Inventors: Jong-Oh Kim; Young-Wook Cha; Kyou-Ho Lee; Jong-Arm Jun; Ik-Kyun Kim, all of Daejeon, Rep. of Korea

[73] Assignees: Electronics and Telecommunications Research Institute, Daejeon; Korea Telecommunication Authority, Seoul, both of Rep. of Korea

[21] Appl. No.: 08/771,269

[22] Filed: Dec. 20, 1996

[30] Foreign Application Priority Data

Nov. 7, 1996 [KR] Rep. of Korea ............... 96-52615

[51] Int. Cl.$^6$ .................... H04L 12/56; H04L 12/28; G06F 11/00
[52] U.S. Cl. .................. 370/229; 370/236; 370/395; 370/456
[58] Field of Search ..................... 370/217, 229, 370/230, 231, 232, 235, 236, 258, 395, 392, 410, 451, 453, 456, 522

[56] References Cited

U.S. PATENT DOCUMENTS 5,519,689  5/1996  Kim ........................... 370/232
5,539,747  7/1996  Ito et al. ..................... 370/235

OTHER PUBLICATIONS

Multiple Access for BISDN; Ernst–Heinrich Goeldner and Manfred N. Huber; 1991; pp. 37–43.
Shared–Medium–Based Subscriber Ring Access to ATM Networks; W. Denzel, A. Engbersen, A. Herkerdorf and E. Port; Apr. 1995; pp. 452–456.

Primary Examiner—Chi H. Pham
Assistant Examiner—Frank Duong
Attorney, Agent, or Firm—Antonelli, Terry, Stout & Kraus, LLP

[57] ABSTRACT

A floating cell removing device using a generic flow control includes a processor having a generic flow control processing logic for transmitting/receiving a signal cell, checking a generic flow control field of an operation and maintenance cell and removing a floating cell; a pair of cell relay and add/drop function units respectively connected to a subscriber and a network of the processor, for supporting an internal communication between subscriber terminals, temporarily storing the signal cell and transmitting it to a network device; a pair of asynchronous transfer mode hierarchical function processors for converting a cell header, inserting and extracting an operation and maintenance cell, and transmitting it to the processor and the cell relay and add/drop function units; and a plurality of buffers formed between the processor and the cell relay and add/drop function units and between the cell relay and add/drop function units, for temporarily storing data inputted therefrom.

4 Claims, 3 Drawing Sheets

FLOATING CELL REMOVING DEVICE USING GENERIC FLOW CONTROL AND A METHOD THEREOF

BACKGROUND OF THE INVENTION

1. Field of the Invention

The present invention relates to a device for removing a floating cell by using generic flow control (GFC) which is generated when a ring type subscriber network is formed to provide broadband services to small offices or home in a Broadband Integrated Services Digital Network and a method thereof.

2. Discussion of Related Art

With development of communication technologies, the demand for high quality regarding various communication services has increased. To satisfy these demands, an asynchronous transfer mode (ATM) Broadband Integrated Services Digital Network (B-ISDN) has been proposed to provide high speed data service including transmission and burst service such as an actual time video service with variable bit rates, as well as continuous services such as a voice service or a video service.

In the past, development has been focused on large-scaled switches applicable to national key networks and the medium-scale of devices for supplying broadband services to private networks or a plurality of regions rather than on the devices for directly supplying services to subscribers.

Most of the above devices are structured in a switch type and thus are adequate to traffic transmission/reception between regions requiring a large input/output capacity. However, particularly when these are used at home or small offices using direct services, these are disadvantageous as compared to a ring or a bus type multi-access configuration, as described in the following.

First, in the switch-structured device, each service terminal must be connected to the switch via its own transmission line, and this requires more transmission lines as compared with the case of a ring or a bus type device, causing a substanial increase in cost.

Secondly, with a complicated switch structure, there is difficulty in maintenance or operation in comparison with a simple multiplexer or a ring type device.

Thirdly, when an input port is required to be added, the multi-access configuration can simply add the input port by connecting it to the preceding terminal or inserting it in the existing configuration. However, the switch-structured device must install it in a switch unit, causing unnecessary port consumption.

However, even when a user turns off the power of any terminal, the switch-structured network does not affect the traffic flow of other terminals. To the contrary, the ring type network cannot communicate any more via the terminals placed in the downstream of the powered-off terminal.

Thus, a power off bypass switch which can control the data flow even at the power off is required for each terminal.

In addition, there is required a method for efficiently removing floating cells generated due to the power off of any terminal during a communication and thus preventing unnecessary cells from occupying the bandwidth.

FIG. 1a and 1b are diagrams showing general configurations of a switch-structured network and a ring type network.

In a switch-structured network of FIG. 1a, each terminal is connected to a broadband network terminator 11 via its own transmission line. Therefore, even when a terminal is powered off during communication, this does not affect the other terminals nor occupy the bandwidth of the other terminals.

Meanwhile, in the ring type network of FIG. 1b where each terminal is connected to a broadband network terminator 16 via one shared line in ring form, if user voluntarily powers off any of the terminals 17, 18, 19 and 110, all terminals placed downstream of the powered-off terminal cannot communicate any more.

Thus, even though a power off bypass switch is installed to prevent the problem described above, all cells to be transmitted to the terminal continuously occupy the bandwidth of the ring. These cells are called floating cells.

Generally, in order to control the flow between each terminal and a network terminator in a point-to-point connection network, four bits are allotted to a generic flow control field in an asynchronous transfer mode (ATM) cell header. But in most cases, the generic flow control field is not used.

FIG. 2 is a diagram showing a cell header format designated in a conventional private network. In FIG. 2, 4 significant bits of the first byte in the cell header comprised of five bytes are assigned to the generic flow control field, and a virtual path identifier (VPI) and a virtual channel identifier (VCI) determine the path via which the cell is to be routed.

The generic flow control field used to control the traffic amount input to the network termination device 11 has a control mode and a non-control mode.

In the non-control mode, the flow of the data input to the network termination device is not controlled and a value "0" is input to the generic flow control field.

On the contrary, the control mode gives a priority order to each cell to be input to the broadband network termination device 11 and then permits the input of the cell of higher priority first, or temporarily suspends the cell flow in the terminal unit (12, 13, 14, 15) if the sum of the traffic sent toward the network termination device 11 exceeds the network termination device capacity.

However, with a complicated algorithm and a greater hardware requirement to control the traffic in the terminal unit, none of existing terminals and network termination devices support the control mode.

In addition, since it is not easily applicable to the multi-access type network, all devices support the non-control mode.

SUMMARY OF THE INVENTION

Accordingly, the present invention is directed to a floating cell removing device using a generic flow control that substantially obviates one or more of the problems described above due to limitations and disadvantages of the related art.

An object of the present invention is to provide a device for removing floating cells generated when a terminal is powered off in a ring type subscriber network by using a generic flow control field in a header and a method thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a floating cell removing device using a generic flow control includes a processor having a generic flow control processing logic for transmitting/receiving a signal cell, checking a generic flow control field of an operation and maintenance cell and removing a floating cell; a pair of cell relay and add/drop function units respectively connected to a subscriber and a network of the processor, for supporting an internal communication between subscriber terminals, temporarily storing the signal cell and transmitting it to a network device; a pair of asynchronous transfer mode hierarchical function processors for converting a cell header, inserting and extracting an operation and maintenance cell, and transmitting it to the processor and the cell relay and add/drop function units; and a plurality of buffers formed between the processor and the cell relay and add/drop function units and between the cell relay and add/drop function units, for temporarily storing data input therefrom.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DETAILED DESCRIPTION OF PREFERRED EMBODIMENT

Reference will now be made in detail to the preferred embodiments of the present invention, examples of which are illustrated in the accompanying drawings.

Figure 3:
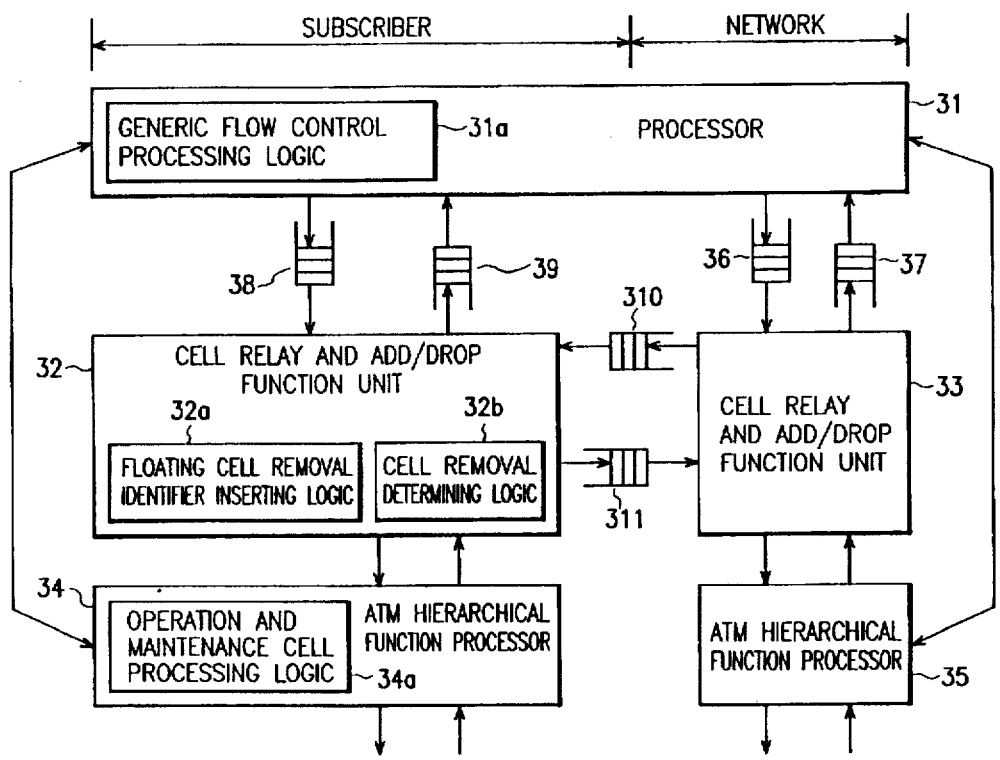
FIG. 3 is a block diagram showing a floating cell removing device using a generic flow control in a broadband network termination device to which the present invention is applied.

FIG. 3 is a block diagram showing a floating cell removing device using a generic flow control in a broadband network termination device to which the present invention is applied.

The floating cell removing device using the generic flow control has a processor 31 for transmitting/receiving and processing a signal cell; cell relay and add/drop function units 32 and 33 each having cell removal determining logic 32b for checking the generic flow control field of the cell transmitted from an asynchronous transfer mode (ATM) hierarchical function processor 34 or 35 and then determining whether or not to remove the cell, and floating cell removal identifier inserting logic 32a for inserting a specific value to the generic flow control field in the header of the cell required to be transmitted by the processor 31; the asynchronous transfer mode hierarchical function processors 34 and 35 for converting a cell header, inserting and extracting an Operation and Maintenance (OAM) cell and performing a basic function of the asynchronous transfer mode hierarchy; and a plurality of buffers 36, 37, 38, 39, 310 and 311.

Figure 1A:
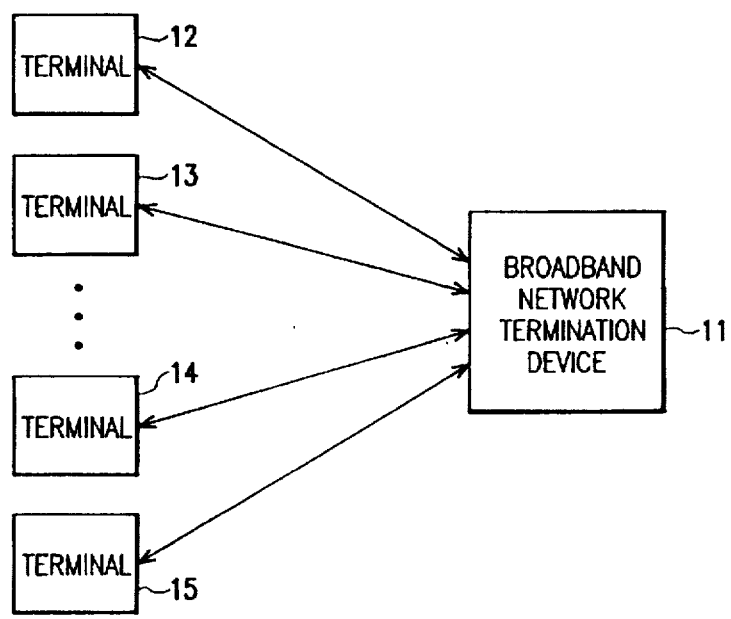
FIG. 1a is a diagram showing a configuration of a general switch structured network.
Figure 1B:
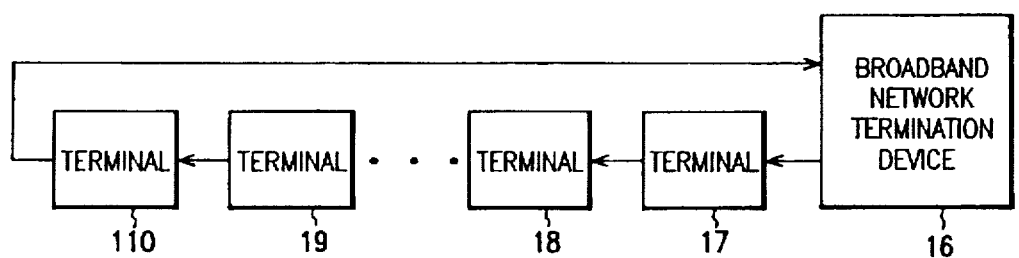
FIG. 1b is a diagram showing a configuration of a general ring type network.
Figure 2:
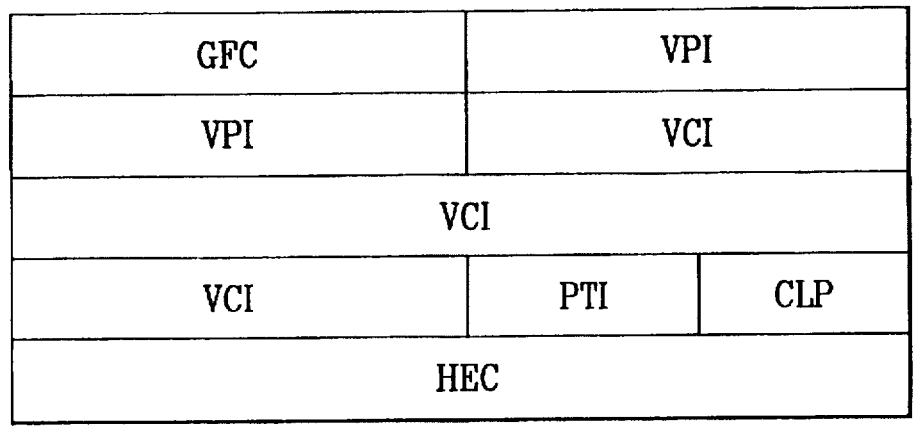
FIG. 2 is a diagram showing a cell header format designated in a conventional private network.

In the ring type broadband subscriber network shown in FIG. 1b, the cells transmitted between respective terminals 17, 18, 19 and 110 or between each terminal and the broadband network termination device 16 are a meta signal cell, a signal cell and an operation and maintenance cell, etc.

The meta signal cell and the signal cell are generated at the processor 31 and transmitted to each terminal (17, 18, 19, 110) via the cell relay and add/drop function unit. The meta signal cell and the signal cell transmitted from each terminal are transmitted from the cell relay and add/drop function unit 32 to the processor 31.

The cell relay and add/drop function units 32 and 33 function to support the internal communication between respective subscriber terminals (17, 18, 19, 110) and to temporarily store the cell required to be transmitted by a network (subscriber) at the buffers 310 and 311 and transmit it to the subscriber terminal (network device) as well as to transmit/receive the signal cell and meta signal cell.

The operation and maintenance cell transmitted to the ATM hierarchical function processor 34 or 35 is controlled at the operation and maintenance cell processing logic 34a therein, transmitted to the processor 31 or to the cell relay and add/drop function unit 32 and then transmitted to the terminal or device in the network (subscriber).

The method for removing the floating cell is as follows.

Referring to the signal cell, the signal cell required to be transmitted by the processor 31 is transmitted to the cell relay and add/drop function units 32 and 33 via the buffers 36 and 38. Thereafter, the floating cell removal identifier inserting logic 32a of the cell relay and add/drop function unit 32 determines whether or not to insert the floating cell removal identifier into the generic flow control field.

The signal cell and meta signal cell to be transmitted from the processor 31 to each subscriber are routed to the buffer 38. Then, the cell relay and add/drop function unit 32 inserts the floating cell removal identifier and then transmits it to each terminal, and the signal cell and meta signal cell to be transmitted to the network are routed to the buffer 36 and are transmitted from the cell relay and add/drop function unit 33 to the network device.

In this case, the generic flow control field must be transmitted with the non-control mode, i.e. "0". The reason the generic flow control field of all cells to be transmitted to the network must be filled with "0" is that if the generic flow control field is not "0", the network devices remove all corresponding cells.

There are two types of signal cell and meta signal cell which are transmitted to the broadband network termination device 16 via the ring. The first is the cell which is transmitted to the network termination device 16 via a normal path of the terminals (17, 18, 19, 110), and the second is the cell which has been required to be transmitted by the broadband network termination device 16 and is retransmitted to the broadband network termination device 16 due to the power off and/or malfunction of the terminal. The second type of cells are determined as floating cells by the cell removal determining logic 32b within the cell relay and add/drop function unit 32 and then are removed.

Referring to the relay cell for communication between subscribers, the inter-subscriber user cell as a communication cell between terminals is supported by rerouting the cells transmitted from the cell relay and add/drop function unit 32 via a ring.

Thereafter, if the ATM hierarchical function processor 34 informs that the cells are inter-subscriber user cells after comparing the header, the floating cell removal identifier inserting logic 32a of the cell relay and add/drop function unit 32 inserts the floating cell removal identifier into the generic flow control field and transmits it to each terminal.

When each terminal within the subscriber network is in a normal operation the cell is dropped in the terminal, thus preventing the cell from flowing again into the network termination device 16. However, when a floating cell is generated due to the abnormal operation of the terminal during communication, the cell is removed at the cell relay and add/drop function unit 32 within the network termination device.

Referring to the remote relay cell between the subscriber and the network, when communication is performed between a terminal within a subscriber network and a terminal within another subscriber network, the cell relay and add/drop function units 32 and 33 support the remote relay by using the buffers 311 and 310.

Thus, when the cell is to be routed to the network, if the cell is transmitted to the cell relay and add/drop function unit 33, the cell relay and add/drop function unit 33 inserts "0" into the generic flow control field and then transmits the cell to the network.

The cell required to be transmitted from the network to the subscriber is transmitted to the cell relay and add/drop function unit 32, and the cell relay and add/drop function unit 32 inserts the floating cell removal identifier into the generic flow control field and transmits it to the corresponding terminal.

When the transmitted cell is retransmitted to the network termination device, the cell relay and add/drop function unit 32 identifies the cell as a floating cell and the floating cell removal determining logic 32b therein removes the corresponding cell.

Referring to the operation and maintenance cell, the transmission/reception processing for the operation and maintenance cell is an inherent function of the ATM hierarchy and control thereof is performed by the ATM hierarchy function processors 34 and 35 and the processor 31.

Each terminal and the subscriber of the broadband network termination device in the subscriber network provide only the operation and maintenance function for the virtual channel. Each terminal provides the termination function for the virtual channel and the subscriber of the broadband network termination device 16 provides the continuity function for the virtual channel.

The operation and maintenance cells associated with the floating cell removal using the generic flow control has an alarm identification signal (AIS) cell which is transmitted from the broadband network termination device 16 to each subscriber terminal, a system management cell for collecting terminal information on the ring, a continuity check cell for checking whether each connection is normally operated in the ATM hierarchy, and a remote defect identification cell generated from each terminal. The AIS cell and the system management cell are inserted to the asynchronous transfer mode hierarchical function processor 34 by the command of the processor 31 and then are transmitted to each terminal.

At the insertion of the cell, the generic flow control processing logic 31a of the processor 31 requires the operation and maintenance cell processing logic 34a to insert the floating cell removal identifier, and then the operation and maintenance cell processing logic 34a inserts the floating cell removal identifier and then transmits it.

If the floating cell is generated, the operation and maintenance cell processing logic 34a of the ATM hierarchical function processor 34 informs the processor 31 of the generation of the floating cell.

The generic flow control processing logic 31a of the processor 31 checks the generic flow control field of the transmitted cell. If it is a normal cell, the generic flow control processing logic 31a performs a general processing for the operation and maintenance cell, and if it is a floating cell, the generic flow control processing logic 31a removes it.

The remote defect identification (RDI) cell and continuity check cell generated at each terminal are transmitted between a terminal of one termination and a terminal of another termination and are regarded as being identical to the remote relay cell.

Thus, the insertion and removal of the floating cell identifier for the continuity check cell and remote defect identification cell of the operation and maintenance cells, the signal and meta signal cell, the inter-subscriber communication cell, and the remote relay cell are performed at the cell relay and add/drop function unit 32, and the alarm identification signal AIS cell and system management cell of the operation and maintenance cell are processed by the ATM hierarchical processor 34 and the processor 31.

Figure 4A:
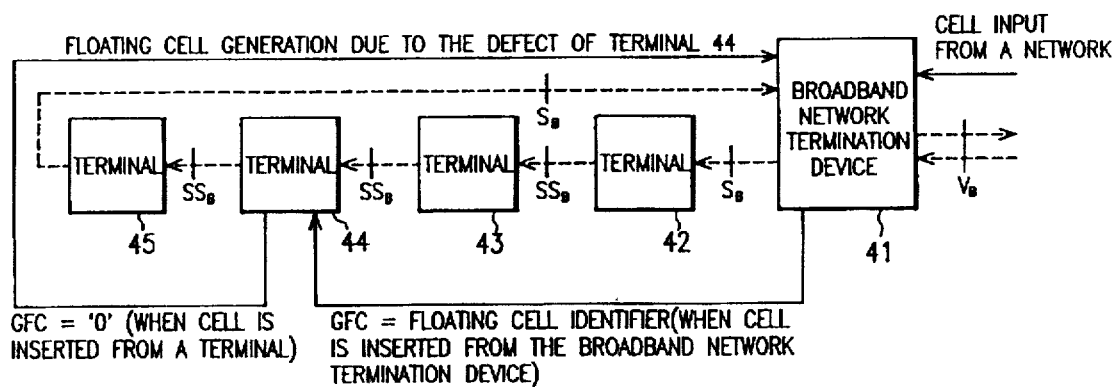
FIGS. 4a and 4b are diagrams showing the floating cell processing and cell flow in the subscriber network according to the present invention.
Figure 4B:
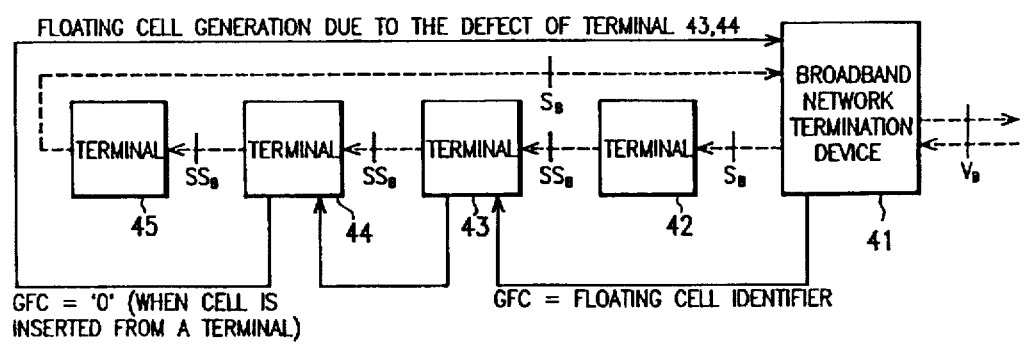

FIGS. 4a and 4b are diagrams showing the floating cell processing and cell flow in the subscriber network of the present invention. FIG. 4a shows the floating cell processing flow for the signal and meta signal cells, remote relay cell and operation and maintenance cell, and FIG. 4b shows the cell flow and the processing of the floating cell generated when communicating between terminals within the subscriber network.

Referring to FIG. 4a, when the broadband network termination device 41 transmits the cell input from the network or the signal and meta signal cell to the terminal 44, the floating cell removal identifier inserting logic 32a of the cell relay and add/drop function unit 32 inserts the floating cell removal identifier into the generic flow control field and then transmits it.

If the terminal 44 operates normally, the cell transmitted from the broadband network termination device 41 is dropped or removed at the terminal 44. However, if the cell transmitted to the ring is retransmitted to the network termination device 41 due to the power off of the terminal 44 by a user without informing the broadband network termination device 41 or due to the malfunction of the terminal 44, the cell removal determining logic 32b within the cell relay and add/drop function unit 32 reads the generic flow control field and determines whether or not to remove the cell.

Thus, in order to normally route the cell transmitted to the ring of the terminal 44, the generic flow control field must be set to the non-control mode to have a value of "0", thus transmitting the cell to the broadband network termination device 41.

Referring to FIG. 4b, in the case of the internal communication between the terminal 44 and the terminal 43, the cell transmitted from the terminal 43 to the ring is input to the terminal 44 and then erased, while the cell transmitted from the terminal 44 is routed to the terminal 43 via the cell relay and add/drop function unit 32 within the broadband network termination device 41.

When the internal communication cell passes through the broadband network termination device 41, the floating cell removal identifier inserting logic 32a of the cell relay and add/drop function unit 32 inserts the floating cell removal identifier into the generic flow control field and then transmits it.

If one or both of the terminals 43 and 44 is/are powered off during the internal communication between the terminal 44 and the terminal 43, the cell removal determining logic 32b within the cell relay and add/drop function unit 32 removes the cell.

As described above, the present invention can remove the floating cell which is generated when a user powers off each ring type terminal without informing the network termination device or when each terminal operates abnormally. Particularly, when the ATM service is provided from home, the method of the present invention can efficiently prevent unnecessary cells from occupying the bandwidth of the ring at the frequent power off, enabling effective use of the bandwidth. In addition, it is possible to easily control the connection on the ring.

It will be apparent to those skilled in the art that various modifications and variations can be made in the manufacturing method of the silicon minute device of the present invention without departing from the spirit or scope of the invention. Thus, it is intended that the present invention cover the modifications and variations of this invention provided they come within the scope of the appended claims and their equivalents.

What is claimed is:

1. A floating cell removing device using generic flow control, comprising:

a processor having generic flow control processing logic for transmitting/receiving a signal cell, checking a generic flow control field of an operation and maintenance cell and removing a floating cell;

cell relay and add/drop function units, respectively connected to a subscriber and a network of said processor, for supporting internal communication between subscriber terminals, temporarily storing said signal cell and transmitting said signal cell to a network device;

asynchronous transfer mode hierarchical function processors for converting a cell header, inserting and extracting the operation and maintenance cell, and transmitting said operation and maintenance cell to said processor and said cell relay and add/drop function units; and a plurality of buffers formed between said processor and said cell relay and add/drop function units and between said cell relay and add/drop function units, for temporarily storing data input therefrom.

2. The floating cell removing device as claimed in claim 1, wherein the cell relay and add/drop function unit connected to said subscriber comprises:

cell removal determining logic for checking the generic flow control field of the cell transmitted from said asynchronous transfer mode hierarchical function processor and determining whether or not to remove said cell; and floating cell removal identifier inserting logic for inserting a specific value into the generic flow control field within a cell header for the cell required to be transmitted by said processor, an internal communication cell between subscribers and a remote relay cell for communicating between a terminal within one network and a terminal within another network.

3. The floating cell removing device as claimed in claim 1, wherein the asynchronous transfer mode hierarchical function processor connected to said subscriber has operation and maintenance cell processing logic for inserting and transmitting a floating cell removal identifier to said processor if said generic flow control processing logic of said processor requires the insertion of said floating cell removal identifier.

4. In a floating cell processing for signal and meta signal cells, an inter-subscriber communication cell, a remote relay cell between a subscriber and a network and an operation and maintenance cell, a floating cell removing method comprising the steps of:

when a broadband network termination device transmits the cell input from the network or said signal and meta signal cells to a terminal, inserting a floating cell removal identifier into a generic flow control field by a floating cell removal identifier inserting logic of a cell relay and add/drop function unit;

if said terminal operates normally, dropping or removing said cell input from said broadband network termination device at said terminal, and, if the cell input to a ring is retransmitted to said broadband network termination device due to the power off of said terminal by a user without informing said broadband network termination device or the malfunction of said terminal, reading the generic flow control field and determining whether or not to remove said cell by floating cell removal determining logic within said cell relay and add/drop function unit;

if internal communication is performed between said terminal and another terminal, inputting the cell transmitted from said another terminal to said terminal and then erasing the cell, and routing the cell transmitted from said terminal to said another terminal via said cell relay and add/drop function unit within said broadband network termination device;

when the internal communication cell passes through said broadband network termination device, inserting said floating cell removal identifier into the generic flow control field and transmitting said floating cell removal identifier by said floating cell removal identifier inserting logic of said cell relay and add/drop function unit; and if one or both of said terminals is/are powered off during an internal communication between said two terminals, removing said cell by said floating cell removal determining logic within said cell relay and add/drop function unit.

* * * * *